United States Patent [19]

Choi et al.

[11] 3,948,055

[45] Apr. 6, 1976

[54] METHOD FOR CONTROLLING STRESS AND INCREASING THE STRENGTH OF SUPPORT MEMBERS IN COAL MINES

[75] Inventors: Dai S. Choi, Ponca City, Okla.; Roger C. Parsons, St. John's, Canada

[73] Assignee: Continental Oil Company, Ponca City, Okla.

[22] Filed: Sept. 3, 1974

[21] Appl. No.: 502,699

[52] U.S. Cl. .................................. 61/36 R; 299/11
[51] Int. Cl.² ........................ E02D 3/14; E02D 3/00
[58] Field of Search ....... 299/11; 61/35, 36 R, 45 R, 61/45 D; 241/1

[56] References Cited
UNITED STATES PATENTS

| | | | |
|---|---|---|---|
| 1,532,826 | 4/1925 | Lessing | 299/5 |
| 3,600,040 | 8/1971 | Dareing | 299/11 |
| 3,850,477 | 11/1974 | Aldricm et al. | 299/18 |
| 3,851,478 | 12/1974 | Ayres | 61/.5 |

*Primary Examiner*—Paul R. Gilliam
*Assistant Examiner*—Alex Grosz
*Attorney, Agent, or Firm*—F. Lindsey Scott

[57] ABSTRACT

A method for controlling stress and increasing the load-bearing strength of support members, the support members comprising coal, of a coal mine wherein the method consists essentially of injecting ammonia or hydrochloric acid into the interior portions of the support members.

9 Claims, No Drawings

METHOD FOR CONTROLLING STRESS AND INCREASING THE STRENGTH OF SUPPORT MEMBERS IN COAL MINES

This invention relates to methods for controlling the stress in support members in coal mines.

This invention further relates to a method for controlling the stress in support members forming the entry to a coal mine.

This invention further relates to a method for controlling stress and increasing the load-bearing strength of support members forming the opening to a coal mine.

This invention further relates to a method for controlling stress and increasing the load-bearing strength of support members inside a coal mine.

This invention more particularly relates to a method for controlling stress and increasing the load-bearing strength of support members of a coal mine by injecting ammonia or hydrochloric acid into interior portions of the support members.

For many years the coal industry has been engaged in an endeavor to improve the safety in coal mines. Numerous means have been employed to improve the safety in coal mines where stress fields are present in the coal seam being mined. For instance, when lateral stresses are present, attempts have been made to relieve such stresses by excavating extra tunnels or rooms parallel to the entry system or areas of coal production so that the extra tunnels or rooms can be allowed to collapse, thus relieving the stress on support members in the areas of interest.

Obviously, such methods leave much to be desired and, accordingly, a continuing search has been conducted for new and improved methods for controlling stress and improving the load-bearing strength of support members in coal mines.

It is an object of the present invention to provide a method for controlling stress and increasing the load-bearing strength of support members.

It is a further objective of the present invention to provide a method for controlling stress and increasing the load-bearing strength of support members of a coal mine.

It has now been found that the objectives of the present invention are accomplished by a method consisting essentially of injecting an effective amount of a material selected from the group consisting of ammonia and hydrochloric acid into the interior portions of such support members, the support members comprising coal.

The present invention provides a method for controlling the stress, both vertical and lateral, and increasing the load-bearing strength of the support members of coal mines. It is to be clearly understood that such support members consist, in a large measure, of coal. Such support members may be pillars inside a coal mine, facing walls forming the walls of a coal mine or the opening to a coal mine and the like. In such support members, it is desirable that a method be available for controlling the vertical and lateral stresses as well as desirably increasing the load-bearing strength of the support members.

It has now been found that stress is readily controlled and the load-bearing strength increased by injecting a material selected from the group consisting of ammonia and hydrochloric acid into the interior portions of the support members. The materials are injected in an amount equal to at least about 0.1 weight percent based on the weight of the interior portions of the support members into which the materials are injected. A desirable range is from about 0.1 to about 5 weight percent and a particularly desirable range is from about 0.3 to about 1 weight percent.

Desirably, the interior portions of the support members into which the materials are injected are at least 5 feet inside the exterior surfaces of the support members. In the case of support pillars, the interior portions into which the materials are injected desirably comprise a center section of the support member having a shape substantially the same as the exterior shape of the support member. The interior portion will, of course, be at least 5 feet smaller in cross-section than the outside of the support pillar.

When facing walls are injected, the interior portions are basically of the same shape as the opening to the mine or other surface enclosed by the facing wall but having an inside dimension of at least 5 feet greater than the opening enclosed by the facing wall. Clearly, in this instance, the interior portion can include a considerable amount of area although it is believed that economics will dictate that no more coal be treated than necessary to relieve the stress and increase the load-bearing strength. Obviously one or more walls of a mine opening and the like can be treated as well as all walls of an opening including the floor and ceiling areas.

Desirably, the ammonia and hydrochloric acid are anhydrous, but quantities of water up to at least about 20 weight percent based on the weight of the ammonia or hydrochloric acid can be tolerated. While the injected materials are desirably anhydrous, the presence of naturally occurring or other water in the support members does not defeat the objectives of this invention although desirably the amount of such water is minimized. The ammonia or hydrochloric acid can, of course, be injected as liquids, gases, or combinations of liquids and gases. The injected materials can also be diluted with inert diluents such as air, hydrogen, carbon dioxide, nitrous oxide, methane, nitrogen, and the like. The inert diluent may be present in quantities as high as 80 weight percent of the injected mixture, although it is preferred that the inert diluent be present in amounts from about 10 to about 50 weight percent.

In the practice of the present invention, a material selected from the group consisting of ammonia or hydrochloric acid is injected into the interior portions of a support member. The injection of the materials causes the coal forming the interior portion of the support member to fracture and expand. Clearly, the pulverant condition of the fractured coal reduces its ability to transmit stress and since the fracturing causes an increase, i.e., up to about 2 percent, in the volume of the coal treated, the expansion makes it possible to shift high stress concentrations near the exterior surfaces of the support members to the interior portions of the support members, thus resulting in a favorable stress distribution in the support member, and increasing the load-bearing strength of the support member. The practice of the present invention is similar when used to treat facing walls since clearly the pulverant condition of the coal reduces its ability to transmit stresses through the treated zone and the load-bearing strength of the treated zone is increased by reason of the expansion of the fractured coal. The materials are injected as described above for a distance of about 5 feet inside the exterior surfaces and into the interior portions of such support members.

The materials are readily injected into pillars, facing walls, and the like by drilling small holes and injecting the material through the holes and the like. Numerous such means for injecting gaseous or liquid materials into coal formations are known to those skilled in the art and need not be discussed further.

Of the materials discussed hereinbefore, hydrochloric acid is preferred since the hydrochloric acid tends to remain in the interior portion of the coal after treatment. By contrast, ammonia is readily lost from the treated portions of the coal support member. It is considered desirable to retain the injected material in the treated area.

In a further embodiment of the present invention, the coal support member, after treatment, is coated with an adhesive coating agent or the like to insure that the injected material does not escape into the coal mine. Obviously, the injected materials are desirably prevented from escaping into the atmosphere of the mine.

Preferably, the untreated portion of the support member is impregnated with an impregnating agent to render it impervious to the injected materials. Several beneficial results are achieved thereby. For instance, the escape of the injected material into the mine is prevented. The structural strength of the external portion of the support member is preserved, i.e., it is undesirable that the injected material be allowed to migrate into the exterior portions of the support members, thus fracturing the external portion as well as the internal portion. Further, such impregnation insures that water and the like will not be allowed to enter the treated interior portion by diffusion through the external portions of the support member and the diffusion through the external portions of the support member and the like.

Substantially any impregnating agent is suitable so long as it is impervious to the materials injected and water. Some suitable impregnating agents are: sodium silicate, polyacrylamides, thermoplastic resins such as amide polymers, thermosetting resins such as phenolic novolac (acid catalyzed), phenolic resol (base catalyzed), polymerized furfural, epoxy resins, furan plastics, urea formaldehyde resins, magnesium oxysulfate cements, and the like.

Of the foregoing agents, sodium silicate, polyacrylamides, magnesium oxysulfate cements, and polymerized furfural are preferred. Sodium silicate is gelled by contact with HCl or ammonia and results in an effective seal at the junction of the impregnated outer portion of the support member and the treated inner portion. The injection of furfural presents a convenient means for sealing the HCl treated portions since the polymerization of furfural is catalyzed by HCl. The magnesium oxysulfates are fire resistant and are effective as impregnating agents. Such impregnating methods and materials are known to those skilled in the art and need not be discussed further.

It is obvious to those skilled in the art that the method of the present invention is useful with coal mine entry systems, coal mine walls, support members, and the like. Of course, as the mine is expanded, the additional support members and the like as required are readily treated by the method of the present invention to control the stress and increase the load-bearing strength of such support members.

Having thus described the invention, it is pointed out that the foregoing description of preferred embodiments is illustrative rather than limiting in nature and that many variations and modifications are possible within the scope of the present invention.

EXAMPLE 1

Blocks of Pittsburg seam coal having the following composition-- volatile matter, 28.5 weight percent; ash, 14.4 weight percent; fixed carbon, 55.3 weight percent; water, 1.8 weight percent; and sulfur, 1.2 weight percent, were used in the tests. The tests were conducted by positioning a block of coal in a confining enclosure to enclose the four vertical sides of the block with the horizontal surfaces confined by plates including strain gauges. The blocks were then treated with anhydrous ammonia and anhydrous hydrochloric acid. The pressure increases are shown below in tabular form. The anhydrous ammonia test is shown in Table 1.

TABLE 1

| $NH_3$ Pressure (psig) | Treatment Time (hours) | Block Pressure (psig) |
|---|---|---|
| 100 | 0 | 0 |
| 100 | 8 | 125 |
| 100 | 24 | 225 |
| 100 | 48 | 325 |
| 100 | 72 | 420 |
| 100 | 96 | 500 |
| 100 | 120 | 575 |
| 100 | 144 | 640 |
| 100 | 168 | 660 |
| 100 | 178 | 660 |
| 0 | 178 | 660 |
| 0 | 180 | 80 |

Clearly the injection of ammonia results in expanding the coal, thus resulting in an increase in the load carried by the expanded coal section. For instance, in coal support pillars the greatest stress in the pillar is normally at the outer surface (outer 1–4 feet). By injecting ammonia or HCl into the interior portions of the pillar, the areas of highest stress are shifted to the interior portions of the pillar. Such internal portions then add to the strength of the pillar by in essence "jacking up" the mine roof. A similar effect is achieved by injecting ammonia or HCl into mine walls, openings, and the like.

The anhydrous HCl tests are shown below in Table 2.

TABLE 2

| HCl Pressure psig | Treatment Time (days) | Block Pressure psig |
|---|---|---|
| 100 | 0 | 0 |
| 100 | ¼ | 445 |
| 100 | ⅓ | 550 |
| 0 | ⅓ | 550 |
| 0 | ½ | 390 |
| 0 | 1 | 440 |
| 0 | 2 | 430 |
| 0 | 3 | 365 |
| 0 | 4 | 340 |
| 0 | 5 | 330 |
| 0 | 6 | 320 |
| 0 | 7 | 312 |
| 0 | 8 | 305 |
| 0 | 9 | 302 |
| 0 | 10 | 302 |
| 0 | 11 | 302 |

The use of anhydrous HCl is shown to achieve the same desirable result achieved using anhydrous ammonia. The HCl does tend to remain in the treated coal to a much greater extent than does the ammonia as evidenced by the retention of block pressure shown.

EXAMPLE 2

A rectangular block (21.9 × 13.1 × 12 mm) of the coal tested in Example 1 was contacted with anhydrous HCl at 100 psig for 1.5 hours. The block absorbed 0.93 weight percent HCl during the treatment. The compressive strength of the untreated coal was 1,680 psi. The compressive strength of the treated coal was 1,090 psi. The coal sample during treatment developed numerous cracks, etc. Clearly such fragmented coal inhibits the transmission of lateral stress through the treated zones. Similar results are achieved with anhydrous ammonia.

It is thus shown that treatment of support members as described herein results in reducing the lateral stress in support members while simultaneously increasing the load-bearing strength of such members.

Having thus described the invention, we claim:

1. A method for controlling stress and increasing the load-bearing strength of support members, said support members comprising coal in a coal mine by fracturing the interior portions of said support members, said method consisting essentially of;
   a. injecting from about 0.01 to about 5 weight percent based on the weight of said internal portions of a material selected from the group consisting of ammonia or hydrochloric acid into the interior portions of said support members; and,
   b. preventing the escape of said material through the exterior surfaces of said support members.

2. The method of claim 1 wherein said support members are facing walls and pillars said interior portions of said support members are at least 5 feet inside the exterior surfaces of said facing walls and pillrs.

3. The method of claim 2 wherein said material is mixed with an inert diluent.

4. The method of claim 2 wherein said inert diluent is selected from the group consisting of air, hydrogen, carbon dioxide, nitrous oxide, methane, nitrogen and mixtures thereof.

5. The method of claim 1 wherein said material is anhydrous hydrochloric acid and wherein said hydrochloric acid is injected in an amount equal to from about 0.3 to about 1.0 weight percent.

6. The method of claim 1 wherein said material is anhydrous ammonia and wherein said ammonia is injected in an amount equal to from about 0.3 to about 1.0 weight percent.

7. The method of claim 2 wherein the exterior surfaces of said facing walls and pillars are coated with a sealing agent in an amount sufficient to prevent the diffusion of said material therethrough.

8. The method of claim 2 wherein the exterior surfaces of said facing walls and pillars are coated with a sealing agent in an amount sufficient to prevent the diffusion of said material therethrough.

9. The method of claim 2 wherein the exterior portions of said facing walls and pillars are impregnated with an impregnating agent in an amount sufficient to prevent the diffusion of said material therethrough.

* * * * *